(12) United States Patent
Anderson et al.

(10) Patent No.: US 11,693,661 B2
(45) Date of Patent: *Jul. 4, 2023

(54) MECHANISM FOR INTERRUPTING AND RESUMING EXECUTION ON AN UNPROTECTED PIPELINE PROCESSOR

(71) Applicant: TEXAS INSTRUMENTS INCORPORATED, Dallas, TX (US)

(72) Inventors: Timothy D. Anderson, University Park, TX (US); Joseph Zbiciak, San Jose, CA (US); Kai Chirca, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/241,198

(22) Filed: Apr. 27, 2021

(65) Prior Publication Data
US 2021/0247980 A1    Aug. 12, 2021

Related U.S. Application Data

(60) Continuation of application No. 16/384,434, filed on Apr. 15, 2019, now Pat. No. 10,990,398, which is a (Continued)

(51) Int. Cl.
*G06F 9/30* (2018.01)
*G06F 9/38* (2018.01)
(Continued)

(52) U.S. Cl.
CPC ........ *G06F 9/3016* (2013.01); *G06F 9/30014* (2013.01); *G06F 9/30036* (2013.01);
(Continued)

(58) Field of Classification Search
CPC .. G06F 9/30123; G06F 9/3861; G06F 9/3867; G06F 9/3838
See application file for complete search history.

(56) References Cited

U.S. PATENT DOCUMENTS

| 5,809,320 A | 9/1998 | Jain et al. |
| 10,990,398 B2* | 4/2021 | Anderson ................ G06F 9/32 |

(Continued)

*Primary Examiner* — David J. Huisman
*Assistant Examiner* — Kasim Alli
(74) *Attorney, Agent, or Firm* — Brian D. Graham; Frank D. Cimino

(57) ABSTRACT

Techniques related to executing a plurality of instructions by a processor comprising receiving a first instruction for execution on an instruction execution pipeline, beginning execution of the first instruction, receiving one or more second instructions for execution on the instruction execution pipeline, the one or more second instructions associated with a higher priority task than the first instruction, storing a register state associated with the execution of the first instruction in one or more registers of a capture queue associated with the instruction execution pipeline, copying the register state from the capture queue to a memory, determining that the one or more second instructions have been executed, copying the register state from the memory to the one or more registers of the capture queue, and restoring the register state to the instruction execution pipeline from the capture queue.

18 Claims, 9 Drawing Sheets

Related U.S. Application Data continuation-in-part of application No. 16/227,238, filed on Dec. 20, 2018, now Pat. No. 11,036,648, which is a continuation of application No. 15/429,205, filed on Feb. 10, 2017, now Pat. No. 10,162,641, which is a division of application No. 14/331,986, filed on Jul. 15, 2014, now Pat. No. 9,606,803.

(60) Provisional application No. 62/786,471, filed on Dec. 30, 2018, provisional application No. 61/846,148, filed on Jul. 15, 2013.

(51) Int. Cl.
| | |
|---|---|
| *G06F 11/10* | (2006.01) |
| *G06F 9/32* | (2018.01) |
| *G06F 12/0875* | (2016.01) |
| *G06F 12/0897* | (2016.01) |
| *G06F 11/00* | (2006.01) |
| *G06F 9/345* | (2018.01) |

(52) U.S. Cl.
CPC ...... *G06F 9/30098* (2013.01); *G06F 9/30112* (2013.01); *G06F 9/30123* (2013.01); *G06F 9/30145* (2013.01); *G06F 9/32* (2013.01); *G06F 9/345* (2013.01); *G06F 9/3802* (2013.01); *G06F 9/383* (2013.01); *G06F 9/3861* (2013.01); *G06F 9/3867* (2013.01); *G06F 11/00* (2013.01); *G06F 11/1048* (2013.01); *G06F 12/0875* (2013.01); *G06F 12/0897* (2013.01); *G06F 9/3822* (2013.01); *G06F 11/10* (2013.01); *G06F 2212/452* (2013.01); *G06F 2212/60* (2013.01)

(56) References Cited

U.S. PATENT DOCUMENTS

| | | |
|---|---|---|
| 2004/0073780 A1 | 4/2004 | Roth et al. |
| 2004/0236928 A1 | 11/2004 | Haugh |
| 2006/0248436 A1 | 11/2006 | LaFrance-Linden |
| 2006/0294344 A1* | 12/2006 | Hsu .................... G06F 9/30123 712/228 |
| 2007/0083742 A1* | 4/2007 | Abernathy ............ G06F 9/3836 712/244 |
| 2012/0084514 A1 | 4/2012 | Blinick et al. |

\* cited by examiner

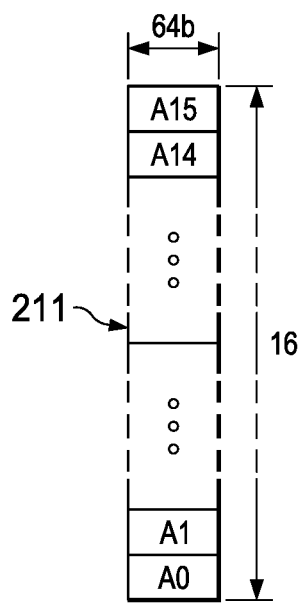 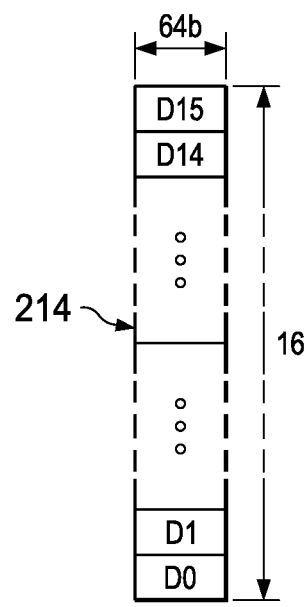
FIG. 3          FIG. 4
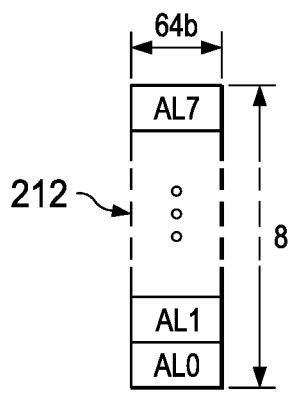 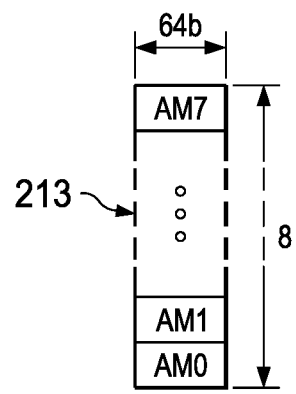
FIG. 5          FIG. 6

MECHANISM FOR INTERRUPTING AND RESUMING EXECUTION ON AN UNPROTECTED PIPELINE PROCESSOR

CROSS-REFERENCE TO RELATED APPLICATIONS

This application is a continuation of U.S. patent application Ser. No. 16/384,434, filed Apr. 15, 2019, now issued as U.S. Pat. No. 10,990,398, which claims priority to U.S. Provisional Application No. 62/786,471, filed Dec. 30, 2018, and is a continuation-in-part of U.S. patent application Ser. No. 16/227,238, filed Dec. 20, 2018, now issued as U.S. Pat. No. 11,036,648, which is a continuation of U.S. patent application Ser. No. 15/429,205, filed Feb. 10, 2017, now issued as U.S. Pat. No. 10,162,641, which is a division of U.S. patent application Ser. No. 14/331,986, filed Jul. 15, 2014, now issued as U.S. Pat. No. 9,606,803, which claims priority to U.S. Provisional Application No. 61/846,148, filed Jul. 15, 2013, all of which are hereby incorporated by reference.

BACKGROUND

Digital signal processors (DSP) are optimized for processing streams of data that may be derived from various input signals, such as sensor data, a video stream, a voice channel, radar signals, biomedical signals, etc. Digital signal processors operating on real-time data typically receive an input data stream, perform a filter function on the data stream (such as encoding or decoding) and output a transformed data stream. The system is called real-time because the application fails if the transformed data stream is not available for output when scheduled. Typical video encoding utilizes a predictable but non-sequential input data pattern. A typical application requires memory access to load data registers in a data register file and then supply data from the data registers to functional units which perform the data processing.

One or more DSP processing cores may be combined with various peripheral circuits, blocks of memory, etc. on a single integrated circuit (IC) die to form a system on chip (SoC). The advent of SoC architectures for embedded systems has created many challenges for the software development systems used to develop and debug software applications that execute on these architectures. These systems may include multiple interconnected processors that share the use of on-chip and off-chip memory. A processor may include some combination of instruction cache (ICache) and data cache (DCache) to improve processing. Furthermore, multiple processors, with memory being shared among them, may be incorporated in a single embedded system. The processors may physically share the same memory without accessing data or executing code located in the same memory locations or they may use some portion of the shared memory as common shared memory.

In early microprocessors, instruction execution was "atomic" in the sense that the processor fetched an instruction and completely executed it before fetching another and executing it, etc. Modern microprocessors typically execute instructions in several steps rather than atomically. This series of steps is called the "instruction execution pipeline", or just the "pipeline". Typically a pipeline will consist of several phases, consisting of steps to read the instruction from memory, decode the instruction, read the values to be operated on, perform the operation, and write the result to some kind of storage. This is called a "pipeline" because a processor can have several instructions executing at the same time in different phases, i.e. "in the pipeline". In this mode of operation, the processor can be fetching an instruction while it is decoding the previous instruction, while it is reading input values for an earlier instruction, etc. By overlapping the execution of instructions, we increase the rate at which the processor can execute instructions.

An implication of pipelining is that an instruction which is in the "read inputs" phase may need a value produced by an earlier instruction, but the "write" of that value has not happened yet. There are generally two ways to deal with this situation: either the processor looks for these situations and insert the appropriate stalls in the pipeline, or the programmer arranges the instructions such that this never happens by scheduling the dependent instructions far enough apart so that the situation does not arise. The former solution is generally called a "protected" pipeline, and the latter solution is called an "unprotected" pipeline. Almost all modern general-purpose architectures implement "protected" pipelines.

Protected pipelines have the advantage that they allow the CPU designers to deepen the pipeline in subsequent generations of the processor while still properly executing legacy code. However, protected pipelines generally require a great deal of logic to detect situations where delays should be inserted in the pipeline.

Unprotected pipelines have the advantage that they require little/no hardware control mechanisms to produce correct program results when executing instructions that require more than one CPU cycle to execute in a pipeline. The programmer or compiler is responsible for scheduling instructions such that instructions complete before their results are needed by subsequent instructions. Unprotected pipelines allow the use of "multiple-assignment" code, in which multiple writes to a particular register can be in the pipeline simultaneously. This is a very low-cost, low-complexity alternative to register renaming, or in a processor without register re-naming, having enough registers in the architecture to hold all in-flight computations, and is useful for high performance low power digital signal processing (DSP) applications.

Existing processors are generally designed to have either protected or unprotected behavior.

SUMMARY

This disclosure relates generally to the field of DSPs. More particularly, but not by way of limitation, aspects of the present disclosure relate to methods for executing a plurality of instructions by a processor. One such method includes executing a plurality of instructions by a processor by receiving a first instruction for execution on an instruction execution pipeline. The method also includes beginning execution of the first instruction. The method further includes receiving one or more second instructions for execution on the instruction execution pipeline, the one or more second instructions associated with a higher priority task than the first instruction. The method also includes storing a register state associated with the execution of the first instruction in one or more registers of a capture queue associated with the instruction execution pipeline. The method further includes copying the register state from the capture queue to a memory. The method also includes determining that the one or more second instructions have been executed. The method further includes copying the register state from the memory to the one or more registers of the capture queue. The method also includes restoring the register state to the instruction execution pipeline from the capture queue.

Another aspect of the present disclosure relates to a processor including an instruction execution pipeline having a plurality of pipeline stages. The processor also includes pipeline circuitry configured to receive a first instruction for execution on an instruction execution pipeline. The pipeline circuitry is further configured to begin execution of the first instruction. The pipeline circuitry is also configured to receive one or more second instructions for execution on the instruction execution pipeline, the one or more second instructions associated with a higher priority task than the first instruction. The pipeline circuitry is further configured to store a register state associated with the execution of the first instruction in one or more registers of a capture queue associated with the instruction execution pipeline. The pipeline circuitry is also configured to copy the register state from the capture queue to a memory. The pipeline circuitry is further configured to determine that the one or more second instructions have been executed. The pipeline circuitry is also configured to copy the register state from the memory to the one or more registers of the capture queue. The pipeline circuitry is further configured to restore the register state to the instruction execution pipeline from the capture queue.

Another aspect of the present disclosure relates to a processing system comprising a memory and a processor. The processor also comprises an instruction execution pipeline having a plurality of pipeline stages. The processor further comprises pipeline circuitry configured to receive a first instruction for execution on an instruction execution pipeline. The pipeline circuitry is further configured to begin execution of the first instruction in an unprotected mode. The pipeline circuitry is also configured to receive one or more second instructions, after execution of the first instruction has begun, for execution on the instruction execution pipeline, the one or more second instructions associated with a higher priority task than the first instruction. The pipeline circuitry is further configured to continue execution of the first instruction to obtain a result. The pipeline circuitry is also configured to store the result of the first instruction in a memory. The pipeline circuitry further configured to determine that the one or more second instructions have been executed. The pipeline circuitry also configured to copy the result from the memory to an output register of the instruction execution pipeline. The pipeline circuitry further configured to output the result of the first instruction.

BRIEF DESCRIPTION OF THE DRAWINGS

For a detailed description of various examples, reference will now be made to the accompanying drawings in which:

FIG. 3 illustrates global scalar register file of the example processor.

FIGS. 4-6 illustrate local register files of the example processor.

DETAILED DESCRIPTION

Digital signal processors (DSP) are optimized for processing streams of data that may be derived from various input signals, such as sensor data, a video stream, a voice channel, radar signals, biomedical signals, etc. Memory bandwidth and scheduling are concerns for digital signal processors operating on real-time data. An example DSP processing core will be described hereinbelow that includes a streaming engine to improve processing efficiency and data scheduling.

One or more DSP processing cores may be combined with various peripheral circuits, blocks of memory, etc. on a single integrated circuit (IC) die to form a system on chip (SoC). See, for example, "66AK2Hx Multicore Keystone™ DSP+ARM® System-on-Chip," 2013, which is incorporated by reference herein.

Various embodiments of a processing core within a given family may have a different number of instruction pipeline stages, depending on a particular technology and cost/performance tradeoffs. The embodiment described here is representative and includes multiple pipelines stages.

Figure 1:
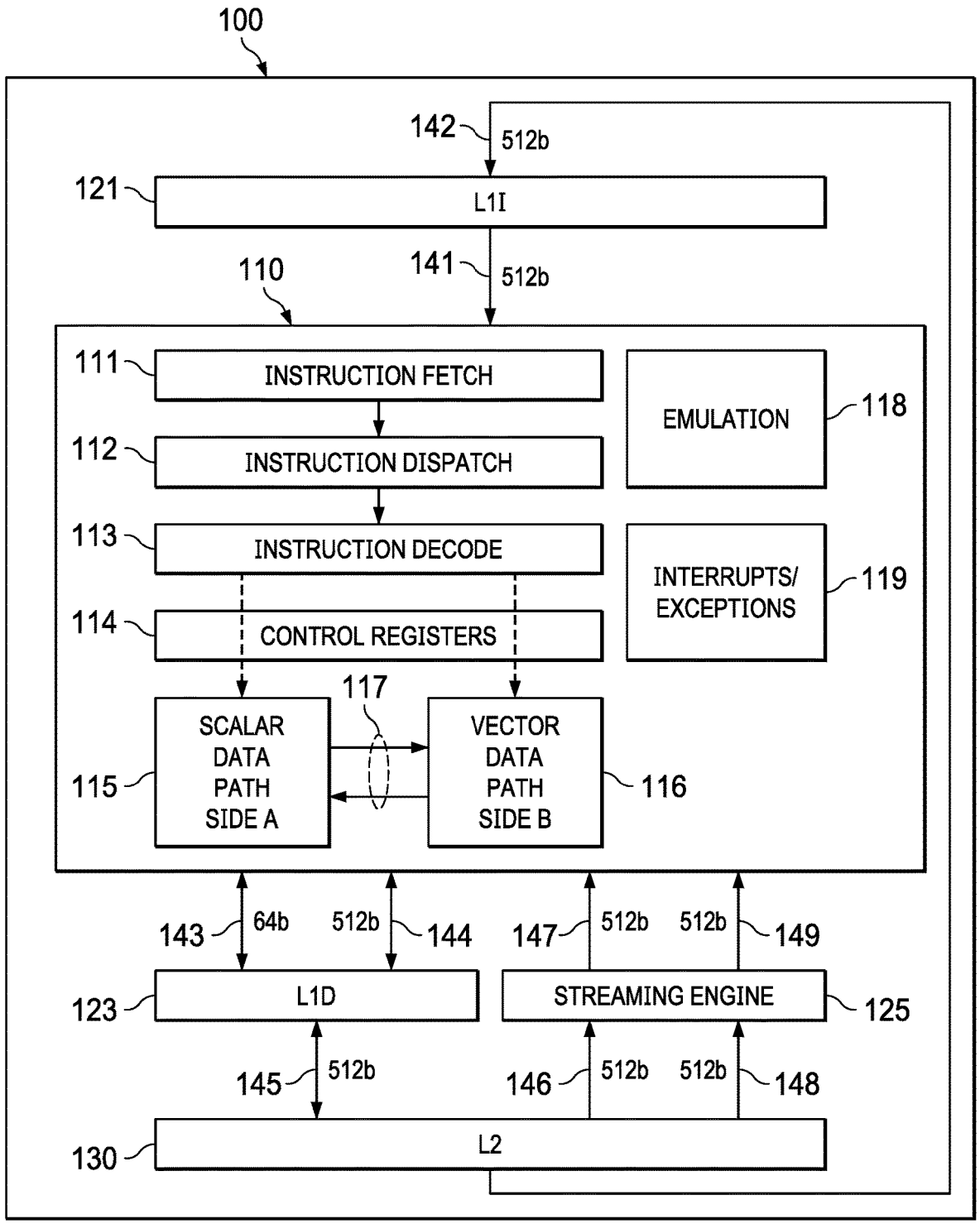
FIG. 1 illustrates an example processor having multiple data paths.

FIG. 1 illustrates an example processor 100 that includes dual scalar/vector data paths 115, 116. Processor 100 includes separate level one instruction cache (L1I) 121 and level one data cache (L1D) 123. Processor 100 includes a L2 combined instruction/data cache (L2) 130 that holds both instructions and data. FIG. 1 illustrates a connection between L1I cache and L2 combined instruction/data cache 130 by way of 512-bit bus 142. FIG. 1 illustrates a connection between L1D cache 123 and L2 combined instruction/data cache 130 by way of 512-bit bus 145. In this example of processor 100, L2 combined instruction/data cache 130 stores both instructions to back up L1I cache 121 and data to back up L1D cache 123. In this example L2 combined instruction/data cache 130 is further connected to higher level cache and/or main memory using known or later developed memory system techniques but not illustrated in FIG. 1. The size of L1I cache 121, L1D cache 123, and L2 cache 130 may be implemented in different sizes in various examples; in this example, L1I cache 121 and L1D cache 123 are each 32 kilobytes, and L2 cache 130 is 1024 kilobytes. In this example, central processing unit core 110, L1I cache 121, L1D cache 123 and L2 combined instruction/data cache 130 are formed on a single integrated circuit. This single integrated circuit optionally includes other circuits.

Central processing unit core 110 fetches instructions from L1I cache 121 as controlled by instruction fetch unit 111. Instruction fetch unit 111 determines the next instructions to be executed and recalls a fetch packet sized set of such instructions. The nature and size of fetch packets are further detailed below. Instructions are directly fetched from L1I cache 121 upon a cache hit (if these instructions are stored in L1I cache 121). Upon a cache miss (the specified instruction fetch packet is not stored in L1I cache 121), these instructions are sought in L2 combined cache 130. In this example, the size of a cache line in L1I cache 121 equals the size of a fetch packet, which is 512 bits. The memory locations of these instructions are either a hit in L2 combined cache 130 or a miss. A hit is serviced from L2 combined cache 130. A miss is serviced from a higher level of cache (not illustrated) or from main memory (not illustrated). In this example, the requested instruction is simultaneously supplied to both L1I cache 121 and central processing unit core 110 to speed use.

In this example, central processing unit core 110 includes plural functional units to perform instruction specified data processing tasks. Instruction dispatch unit 112 determines the target functional unit of each fetched instruction. In this example central processing unit 110 operates as a very long instruction word (VLIW) processor capable of operating on plural instructions in corresponding functional units simultaneously. Preferably a complier organizes instructions in execute packets that are executed together. Instruction dispatch unit 112 directs each instruction to its target functional unit. The functional unit assigned to an instruction is completely specified by the instruction produced by a compiler. The hardware of central processing unit core 110 has no part in this functional unit assignment. In this example instruction dispatch unit 112 may operate on several instructions in parallel. The number of such parallel instructions is set by the size of the execute packet. This will be further detailed hereinbelow.

Instruction decode unit 113 decodes each instruction in a current execute packet. Decoding includes identification of the functional unit performing the instruction, identification of registers used to supply data for the corresponding data processing operation from among possible register files and identification of the register destination of the results of the corresponding data processing operation. As further explained below, instructions may include a constant field in place of one register number operand field. The result(s) of this decoding are signals for control of the target functional unit to perform the data processing operation specified by the corresponding instruction on the specified data.

Central processing unit core 110 includes control registers 114. Control registers 114 store information for control of the functional units in scalar data path side A 115 and vector data path side B 116. This information may include mode information or the like.

The decoded instructions from instruction decode 113 and information stored in control registers 114 are supplied to scalar data path side A 115 and vector data path side B 116. As a result, functional units within scalar data path side A 115 and vector data path side B 116 perform instruction specified data processing operations upon instruction specified data and store the results in an instruction specified data register or registers. Each of scalar data path side A 115 and vector data path side B 116 include plural functional units that operate in parallel. These will be further detailed below in conjunction with FIG. 2. There is a data path 117 between scalar data path side A 115 and vector data path side B 116 permitting data exchange.

Central processing unit core 110 includes further non-instruction-based modules. Emulation unit 118 permits determination of the machine state of central processing unit core 110 in response to instructions. This capability will typically be employed for algorithmic development. Interrupts/exceptions unit 119 enables central processing unit core 110 to be responsive to external, asynchronous events (interrupts) and to respond to attempts to perform improper operations (exceptions).

Processor 100 includes streaming engine 125. Streaming engine 125 supplies two data streams from predetermined addresses typically cached in L2 combined cache 130 to register files of vector data path side B of central processing unit core 110. This provides controlled data movement from memory (as cached in L2 combined cache 130) directly to functional unit operand inputs.

FIG. 1 illustrates example data widths of busses between various parts. L1I cache 121 supplies instructions to instruction fetch unit 111 via bus 141. Bus 141 is a 512-bit bus in this example. Bus 141 is unidirectional from L1I cache 121 to central processing unit 110. L2 combined cache 130 supplies instructions to L1I cache 121 via bus 142. Bus 142 is a 512-bit bus in this example. Bus 142 is unidirectional from L2 combined cache 130 to L1I cache 121.

L1D cache 123 exchanges data with register files in scalar data path side A 115 via bus 143. Bus 143 is a 64-bit bus in this example. L1D cache 123 exchanges data with register files in vector data path side B 116 via bus 144. Bus 144 is a 512-bit bus in this example. Busses 143 and 144 are illustrated as bidirectional supporting both central processing unit 110 data reads and data writes. L1D cache 123 exchanges data with L2 combined cache 130 via bus 145. Bus 145 is a 512-bit bus in this example. Bus 145 is illustrated as bidirectional supporting cache service for both central processing unit 110 data reads and data writes.

Processor data requests are directly fetched from L1D cache 123 upon a cache hit (if the requested data is stored in L1D cache 123). Upon a cache miss (the specified data is not stored in L1D cache 123), this data is sought in L2 combined cache 130. The memory locations of this requested data are either a hit in L2 combined cache 130 or a miss. A hit is serviced from L2 combined cache 130. A miss is serviced from another level of cache (not illustrated) or from main memory (not illustrated). The requested data may be simultaneously supplied to both L1D cache 123 and central processing unit core 110 to speed use.

L2 combined cache 130 supplies data of a first data stream to streaming engine 125 via bus 146. Bus 146 is a 512-bit bus in this example. Streaming engine 125 supplies data of this first data stream to functional units of vector data path side B 116 via bus 147. Bus 147 is a 512-bit bus in this example. L2 combined cache 130 supplies data of a second data stream to streaming engine 125 via bus 148. Bus 148 is a 512-bit bus in this example. Streaming engine 125 supplies data of this second data stream to functional units of vector data path side B 116 via bus 149, which is a 512-bit bus in this example. Busses 146, 147, 148 and 149 are illustrated as unidirectional from L2 combined cache 130 to streaming engine 125 and to vector data path side B 116 in accordance with this example.

Figure 2:
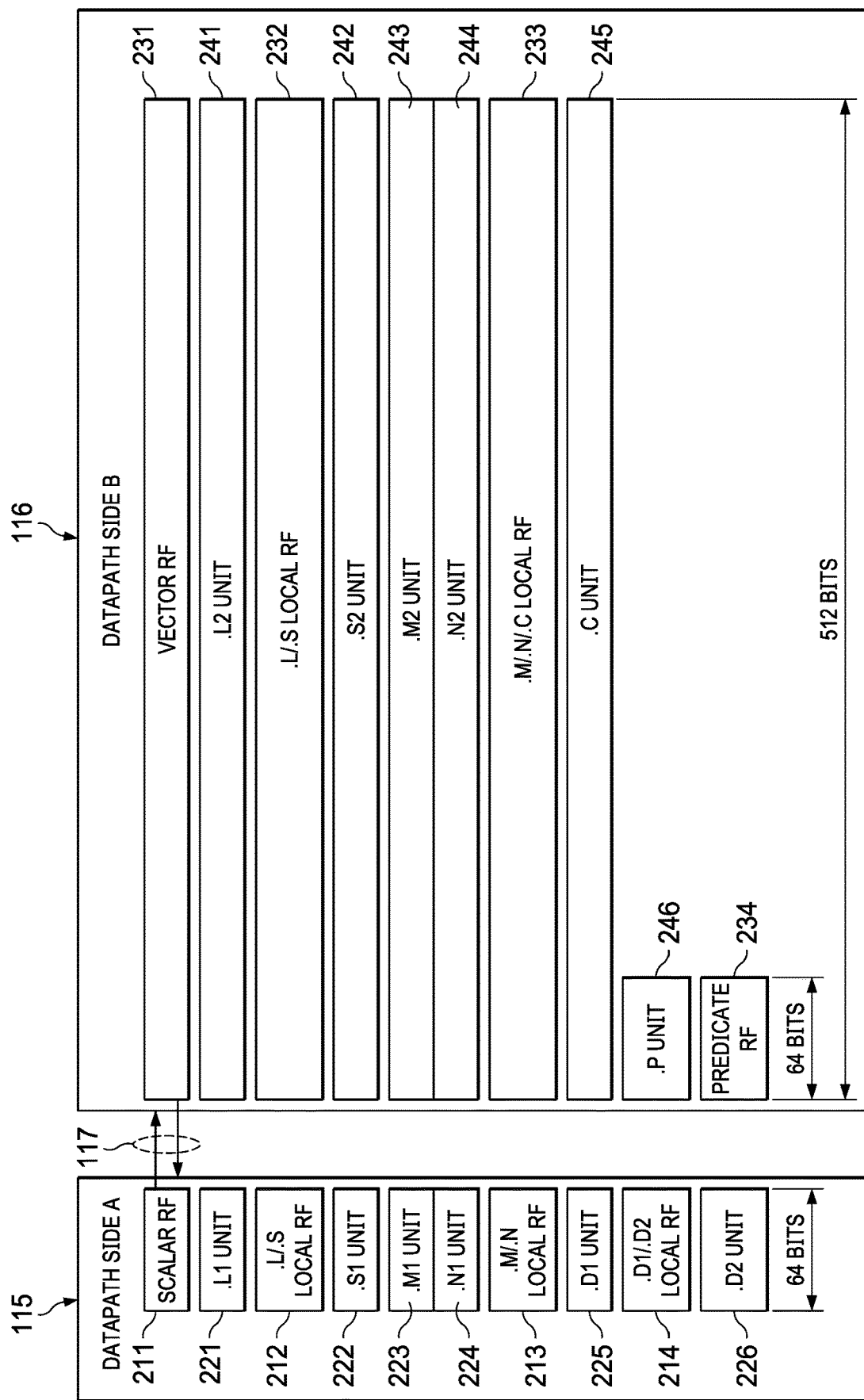
FIG. 2 illustrates details of functional units and register files of the example processor.

FIG. 2 illustrates further details of functional units and register files within scalar data path side A 115 and vector data path side B 116. Scalar data path side A 115 includes L1 unit 221, S1 unit 222, M1 unit 223, N1 unit 224, D1 unit 225 and D2 unit 226. Scalar data path side A 115 includes global scalar register file 211, L1/S1 local register file 212, M1/N1 local register file 213 and D1/D2 local register file 214. Vector data path side B 116 includes L2 unit 241, S2 unit 242, M2 unit 243, N2 unit 244, C unit 245 and P unit 246. Vector data path side B 116 includes global vector register file 231, L2/S2 local register file 232, M2/N2/C local register file 233 and predicate register file 234. There are limitations upon which functional units may read from or write to which register files. These will be described in more detail hereinbelow.

Scalar data path side A 115 includes L1 unit 221. L1 unit 221 generally accepts two 64-bit operands and produces one 64-bit result. The two operands are each recalled from an instruction specified register in either global scalar register file 211 or L1/S1 local register file 212. L1 unit 221 may perform the following instruction selected operations: 64-bit add/subtract operations; 32-bit min/max operations; 8-bit Single Instruction Multiple Data (SIMD) instructions such as sum of absolute value, minimum and maximum determinations, circular min/max operations, and various move operations between register files. The result may be written into an instruction specified register of global scalar register file 211, L1/S1 local register file 212, M1/N1 local register file 213 or D1/D2 local register file 214.

Scalar data path side A 115 includes S1 unit 222. S1 unit 222 generally accepts two 64-bit operands and produces one 64-bit result. The two operands are each recalled from an instruction specified register in either global scalar register file 211 or L1/S1 local register file 212. In this example, S1 unit 222 performs the same type operations as L1 unit 221. In another example, there may be slight variations between the data processing operations supported by L1 unit 221 and S1 unit 222. The result may be written into an instruction specified register of global scalar register file 211, L1/S1 local register file 212, M1/N1 local register file 213 or D1/D2 local register file 214.

Scalar data path side A 115 includes M1 unit 223. M1 unit 223 generally accepts two 64-bit operands and produces one 64-bit result. The two operands are each recalled from an instruction specified register in either global scalar register file 211 or M1/N1 local register file 213. In this example, M1 unit 223 performs the following instruction selected operations: 8-bit multiply operations; complex dot product operations; 32-bit bit count operations; complex conjugate multiply operations; and bit wise logical operations, moves, adds and subtracts. The result may be written into an instruction specified register of global scalar register file 211, L1/S1 local register file 212, M1/N1 local register file 213 or D1/D2 local register file 214.

Scalar data path side A 115 includes N1 unit 224. N1 unit 224 generally accepts two 64-bit operands and produces one 64-bit result. The two operands are each recalled from an instruction specified register in either global scalar register file 211 or M1/N1 local register file 213. In this example, N1 unit 224 performs the same type operations as M1 unit 223. There may be certain double operations (called dual issued instructions) that employ both the M1 unit 223 and the N1 unit 224 together. The result may be written into an instruction specified register of global scalar register file 211, L1/S1 local register file 212, M1/N1 local register file 213 or D1/D2 local register file 214.

Scalar data path side A 115 includes D1 unit 225 and D2 unit 226. D1 unit 225 and D2 unit 226 generally each accept two 64-bit operands and each produce one 64-bit result. D1 unit 225 and D2 unit 226 generally perform address calculations and corresponding load and store operations. D1 unit 225 is used for scalar loads and stores of 64 bits. D2 unit 226 is used for vector loads and stores of 512 bits. In this example, D1 unit 225 and D2 unit 226 also perform: swapping, pack and unpack on the load and store data; 64-bit SIMD arithmetic operations; and 64-bit bit wise logical operations. D1/D2 local register file 214 will generally store base and offset addresses used in address calculations for the corresponding loads and stores. The two operands are each recalled from an instruction specified register in either global scalar register file 211 or D1/D2 local register file 214. The calculated result may be written into an instruction specified register of global scalar register file 211, L1/S1 local register file 212, M1/N1 local register file 213 or D1/D2 local register file 214.

Vector data path side B 116 includes L2 unit 241. L2 unit 241 generally accepts two 512-bit operands and produces one 512-bit result. The two operands are each recalled from an instruction specified register in either global vector register file 231, L2/S2 local register file 232 or predicate register file 234. In this example, L2 unit 241 performs instruction similar to L1 unit 221 except on wider 512-bit data. The result may be written into an instruction specified register of global vector register file 231, L2/S2 local register file 232, M2/N2/C local register file 233 or predicate register file 234.

Vector data path side B 116 includes S2 unit 242. S2 unit 242 generally accepts two 512-bit operands and produces one 512-bit result. The two operands are each recalled from an instruction specified register in either global vector register file 231, L2/S2 local register file 232 or predicate register file 234. In this example, S2 unit 242 performs instructions similar to S1 unit 222. The result may be written into an instruction specified register of global vector register file 231, L2/S2 local register file 232, M2/N2/C local register file 233 or predicate register file 234.

Vector data path side B 116 includes M2 unit 243. M2 unit 243 generally accepts two 512-bit operands and produces one 512-bit result. The two operands are each recalled from an instruction specified register in either global vector register file 231 or M2/N2/C local register file 233. In this example, M2 unit 243 performs instructions similar to M1 unit 223 except on wider 512-bit data. The result may be written into an instruction specified register of global vector register file 231, L2/S2 local register file 232 or M2/N2/C local register file 233.

Vector data path side B 116 includes N2 unit 244. N2 unit 244 generally accepts two 512-bit operands and produces one 512-bit result. The two operands are each recalled from an instruction specified register in either global vector register file 231 or M2/N2/C local register file 233. In this example, N2 unit 244 performs the same type of operations as M2 unit 243. There may be certain double operations (called dual issued instructions) that employ both M2 unit 243 and the N2 unit 244 together. The result may be written into an instruction specified register of global vector register file 231, L2/S2 local register file 232 or M2/N2/C local register file 233.

Vector data path side B 116 includes correlation (C) unit 245. C unit 245 generally accepts two 512-bit operands and produces one 512-bit result. The two operands are each recalled from an instruction specified register in either global vector register file 231 or M2/N2/C local register file 233.

Vector data path side B 116 includes P unit 246. Vector predicate (P) unit 246 performs basic logic operations on registers of local predicate register file 234. P unit 246 has direct access to read from and write to predication register file 234.

FIG. 3 illustrates global scalar register file 211. There are 16 independent 64-bit wide scalar registers designated A0 to A15. Each register of global scalar register file 211 can be read from or written to as 64-bits of scalar data. All scalar data path side A 115 functional units (L1 unit 221, S1 unit 222, M1 unit 223, N1 unit 224, D1 unit 225 and D2 unit 226) can read from or write to global scalar register file 211.

Global scalar register file 211 may be read from as 32-bits or as 64-bits and may only be written to as 64-bits. The instruction executing determines the read data size. Vector data path side B 116 functional units (L2 unit 241, S2 unit 242, M2 unit 243, N2 unit 244, C unit 245 and P unit 246) can read from global scalar register file 211 via cross path 117 under restrictions that will be detailed below.

FIG. 4 illustrates D1/D2 local register file 214. There are sixteen independent 64-bit wide scalar registers designated D0 to D15. Each register of D1/D2 local register file 214 can be read from or written to as 64-bits of scalar data. All scalar data path side A 115 functional units (L1 unit 221, S1 unit 222, M1 unit 223, N1 unit 224, D1 unit 225 and D2 unit 226) can write to global scalar register file 211. Only D1 unit 225 and D2 unit 226 can read from D1/D2 local scalar register file 214. It is expected that data stored in D1/D2 local scalar register file 214 will include base addresses and offset addresses used in address calculation.

FIG. 5 illustrates L1/S1 local register file 212. In this example, L1/S1 local register file 212 includes eight independent 64-bit wide scalar registers designated AL0 to AL7. In this example, the instruction coding permits L1/S1 local register file 212 to include up to 16 registers. In this example, only eight registers are implemented to reduce circuit size and complexity. Each register of L1/S1 local register file 212 can be read from or written to as 64-bits of scalar data. All scalar data path side A 115 functional units (L1 unit 221, S1 unit 222, M1 unit 223, N1 unit 224, D1 unit 225 and D2 unit 226) can write to L1/S1 local scalar register file 212. Only L1 unit 221 and S1 unit 222 can read from L1/S1 local scalar register file 212.

FIG. 6 illustrates M1/N1 local register file 213. In this example, eight independent 64-bit wide scalar registers designated AM0 to AM7 are implemented. In this example, the instruction coding permits M1/N1 local register file 213 to include up to 16 registers. In this example, only eight registers are implemented to reduce circuit size and complexity. Each register of M1/N1 local register file 213 can be read from or written to as 64-bits of scalar data. All scalar data path side A 115 functional units (L1 unit 221, S1 unit 222, M1 unit 223, N1 unit 224, D1 unit 225 and D2 unit 226) can write to M1/N1 local scalar register file 213. Only M1 unit 223 and N1 unit 224 can read from M1/N1 local scalar register file 213.

Figure 7:
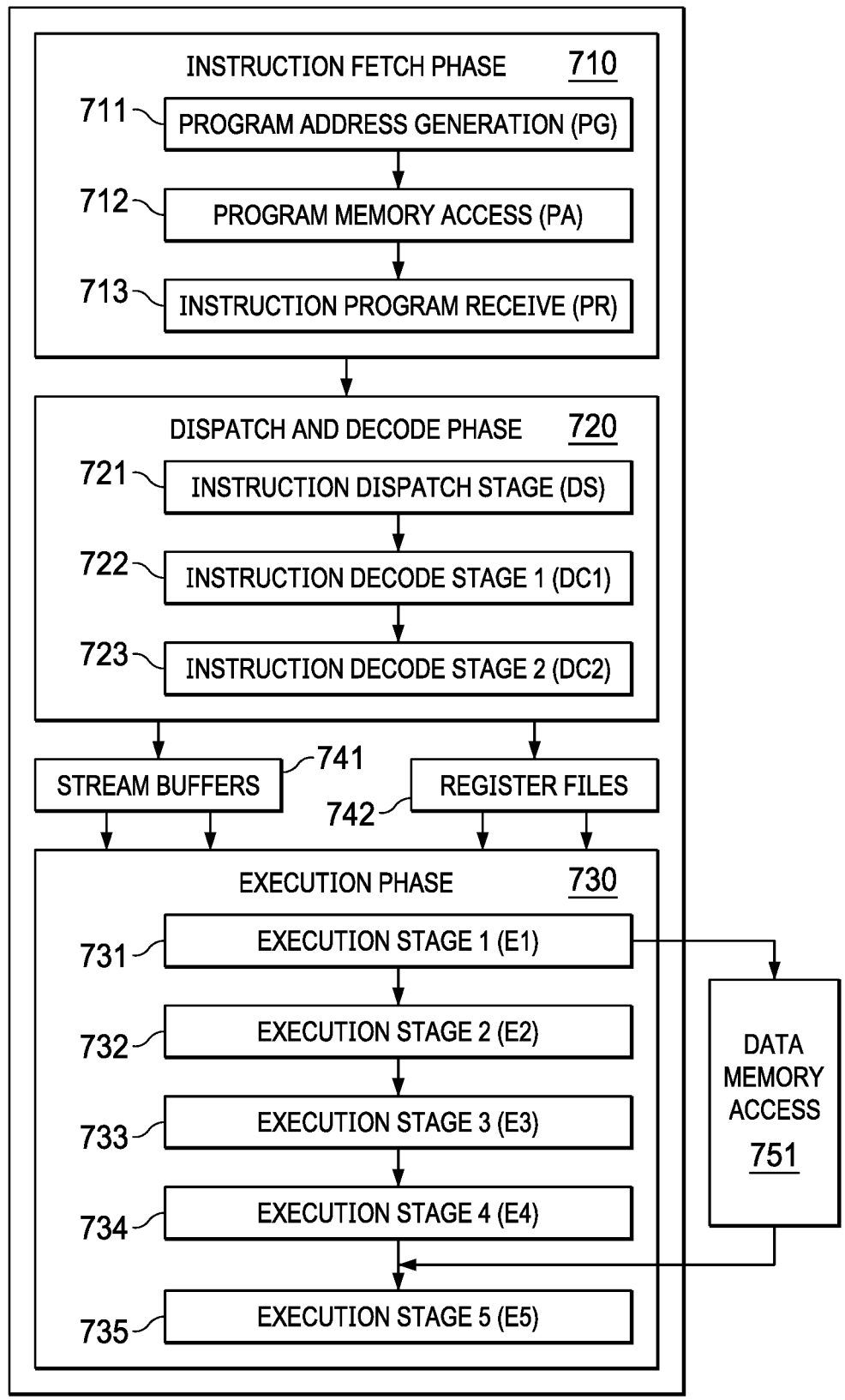
FIG. 7 illustrates pipeline phases of the example processor.

FIG. 7 illustrates the following pipeline phases: program fetch phase 710, dispatch and decode phases 720 and execution phases 730. Program fetch phase 710 includes three stages for all instructions. Dispatch and decode phases 720 include three stages for all instructions. Execution phase 730 includes one to four stages dependent on the instruction.

Fetch phase 710 includes program address generation (PG) stage 711, program access (PA) stage 712 and program receive (PR) stage 713. During program address generation stage 711, the program address is generated in the processor and the read request is sent to the memory controller for the L1I cache. During the program access stage 712 the L1I cache processes the request, accesses the data in its memory and sends a fetch packet to the processor boundary. During the program receive stage 713 the processor registers the fetch packet.

Processor core 110 (FIG. 1) and L1I cache 121 pipelines (FIG. 1) are de-coupled from each other. Fetch packet returns from L1I cache can take a different number of clock cycles, depending on external circumstances such as whether there is a hit in L1I cache 121 or a hit in L2 combined cache 130. Therefore, program access stage 712 can take several clock cycles instead of one clock cycle as in the other stages.

The instructions executing in parallel constitute an execute packet. In this example, an execute packet can contain up to sixteen 32-bit wide slots for sixteen instructions. No two instructions in an execute packet may use the same functional unit. A slot is one of five types: 1) a self-contained instruction executed on one of the functional units of processor core 110 (L1 unit 221, S1 unit 222, M1 unit 223, N1 unit 224, D1 unit 225, D2 unit 226, L2 unit 241, S2 unit 242, M2 unit 243, N2 unit 244, C unit 245 and P unit 246); 2) a unitless instruction such as a NOP (no operation) instruction or multiple NOP instructions; 3) a branch instruction; 4) a constant field extension; and 5) a conditional code extension. Some of these slot types will be further explained hereinbelow.

Dispatch and decode phases 720 (FIG. 7) include instruction dispatch to appropriate execution unit (DS) stage 721, instruction pre-decode (DC1) stage 722; and instruction decode, operand read (DC2) stage 723. During instruction dispatch to appropriate execution unit stage 721, the fetch packets are split into execute packets and assigned to the appropriate functional units. During the instruction pre-decode stage 722, the source registers, destination registers and associated paths are decoded for the execution of the instructions in the functional units. During the instruction decode, operand read stage 723, more detailed unit decodes are done, as well as reading operands from the register files.

Execution phase 730 includes execution (E1 to E5) stages 731 to 735. Different types of instructions require different numbers of these stages to complete their execution. These stages of the pipeline play an important role in understanding the device state at processor cycle boundaries.

During E1 stage 731 the conditions for the instructions are evaluated and operands are operated on. As illustrated in FIG. 7, E1 stage 731 may receive operands from a stream buffer 741 and one of the register files shown schematically as 742. For load and store instructions, address generation is performed, and address modifications are written to a register file. For branch instructions, branch fetch packet in PG phase 711 is affected. As illustrated in FIG. 7, load and store instructions access memory here shown schematically as memory 751. For single-cycle instructions, results are written to a destination register file. This assumes that any conditions for the instructions are evaluated as true. If a condition is evaluated as false, the instruction does not write any results or have any pipeline operation after E1 stage 731.

During E2 stage 732 load instructions send the address to memory. Store instructions send the address and data to memory. Single-cycle instructions that saturate results set the saturation (SAT) bit in the control status register (CSR) if saturation occurs. For 2-cycle instructions, results are written to a destination register file.

During E3 stage 733 data memory accesses are performed. Any multiply instructions that saturate results set the SAT bit in the control status register (CSR) if saturation occurs. For 3-cycle instructions, results are written to a destination register file.

During E4 stage 734 load instructions bring data to the processor boundary. For 4-cycle instructions, results are written to a destination register file.

During E5 stage 735 load instructions write data into a register. This is illustrated schematically in FIG. 7 with input from memory 751 to E5 stage 1135.

As discussed above, processor 100 can be operated both in a protected mode and in an unprotected mode. In certain cases, pipeline protection may be enabled or disabled by setting a processor bit. For example, protection may be controlled by setting a bit in a control register, such as a task state register. In certain cases, instructions may be used to set the protection modes, such as PROT or UNPROT.

Unprotected mode, or exposed pipeline mode, is the traditional VLIW operational mode. Unprotected mode requires the programmer or compiler to understand the latencies of the instructions and to insert NOPs or other instructions between dependent instructions to guarantee correctness. For example, a first instruction MPY32 A0, A1, A2; Multiply may be received by the processor. This instruction takes four processor cycles to execute and outputs to the A2 register. If the programmer or compiler wants to use the output of the MPY32 instruction for a second instruction, such as ADD A2, A8, A8; Accumulate, it is up to the programmer or compiler to insert three NOP instructions to obtain correct behavior. However, unexpected events, such as handling an interrupt or a cache miss, may cause the programmer or compiler inserted NOP instructions to be inaccurate.

In protected, or unexposed pipeline mode, the pipeline conforms to sequential operation model where dependent instructions are guaranteed to be correct, regardless of how many cycles it takes to complete the instructions. For an instruction which takes multiple cycles to complete, if a subsequent instruction attempts to read the destination of the first instruction within the delay slots of that first instruction, the CPU pipeline will automatically insert NOP cycles until the instruction which will write that register has completed. In the above example, if the processor 100 receives, in protected mode, the MPY32 instruction followed by the ADD instruction, the processor 100 would automatically insert three NOP cycles between the instructions.

Pipeline hazards may exist in certain processors, such as a multi-stage pipelined processor capable of processing multiple instructions in a pipeline. Unresolved pipeline hazards generally are conditions where a processor may produce undesired or unexpected results. Different types of pipeline hazards may exist. Two such types include data hazards and structural hazards. Data hazards generally are scenarios where an instruction executing in a pipeline refers to data from a preceding instruction. Data hazards can result in race conditions if not handled. Generally, data hazards include a read after write and a write after write. Examples of data hazards include, but are not limited to, when a later in time instruction attempts to access a result of a previous instruction that is still being processed.

Structural hazards generally occur due to the structure of the datapath for a processor. Certain processors may be limited in the way writes are performed. In one such example, a single functional unit may be able to perform a single write to an output register file per clock cycle, and a situation may arise where two instructions attempt to output their results to the same register in a single cycle. Thus, when a first instruction which takes two clock cycles to complete is executed on a functional unit, followed by a second instruction which takes one clock cycle to complete on the same functional unit, both instructions would complete and attempt to write to the output register file in the same cycle.

In certain processors, when executing in protected mode, when a pipeline dependency is found, all of the functional units and entire execution pipeline from instruction fetch through the E1 stage may be stalled. As all functional units are stalled, no units are allowed to advance until the pipeline conflict has been resolved. To help address data hazard conditions, enable fast processor mode switching, and address load/store latency in both protected and unprotected modes, as well as enable recoverable interrupts in unprotected mode, capture queues may be used. The capture queue structures help save a state of a pipeline register and later write back the saved state, for example to continue execution or output to the general register file. Capture queues may be used to detect hazard conditions, generate appropriate stalls, and load and unload capture queue registers to help address pipeline hazards in protected mode. As discussed herein, while interrupts and exceptions are distinct concepts, they can be handled by a processor in a similar manner and the terms may be used interchangeably in this disclosure.

In certain cases, capture queues may also be used in conjunction with processors executing in an unprotected mode, or processors with unprotected pipelines. For example, capture queues may be used to help enable recoverable interrupts. As an example, a processor may receive a four cycle MPY32 instruction that outputs to the A2 register in four cycles. As the processor is in unprotected mode, the executing code may then issue a one cycle shift (SHR) instruction on the data currently in A2. The SHR instruction is then followed by a one cycle move (MV) instruction which moves the shifted data in A2 to an A3 register. A NOP may then be inserted and then the results of the MPY instructions are output to A2. An ADD instruction may then be performed using data from A2. If an interrupt is received after the SHR instruction but before the MV, undesired results may occur. For example, the transfer to the interrupt handler may make sure all pending writes in the pipeline are completed before beginning the execution of the interrupt handler to avoid results from the interrupt handler corrupting the program. The interrupt handler would thus allow the MPY32 instruction to complete and output to A2. After the interrupt handler returns, the results of the MPY32 would be restored to A2 and the next instruction, MV, to execute. However, the MV instruction would now execute on the results of the MPY32, rather than on the results of the SHR instruction.

Figure 8:
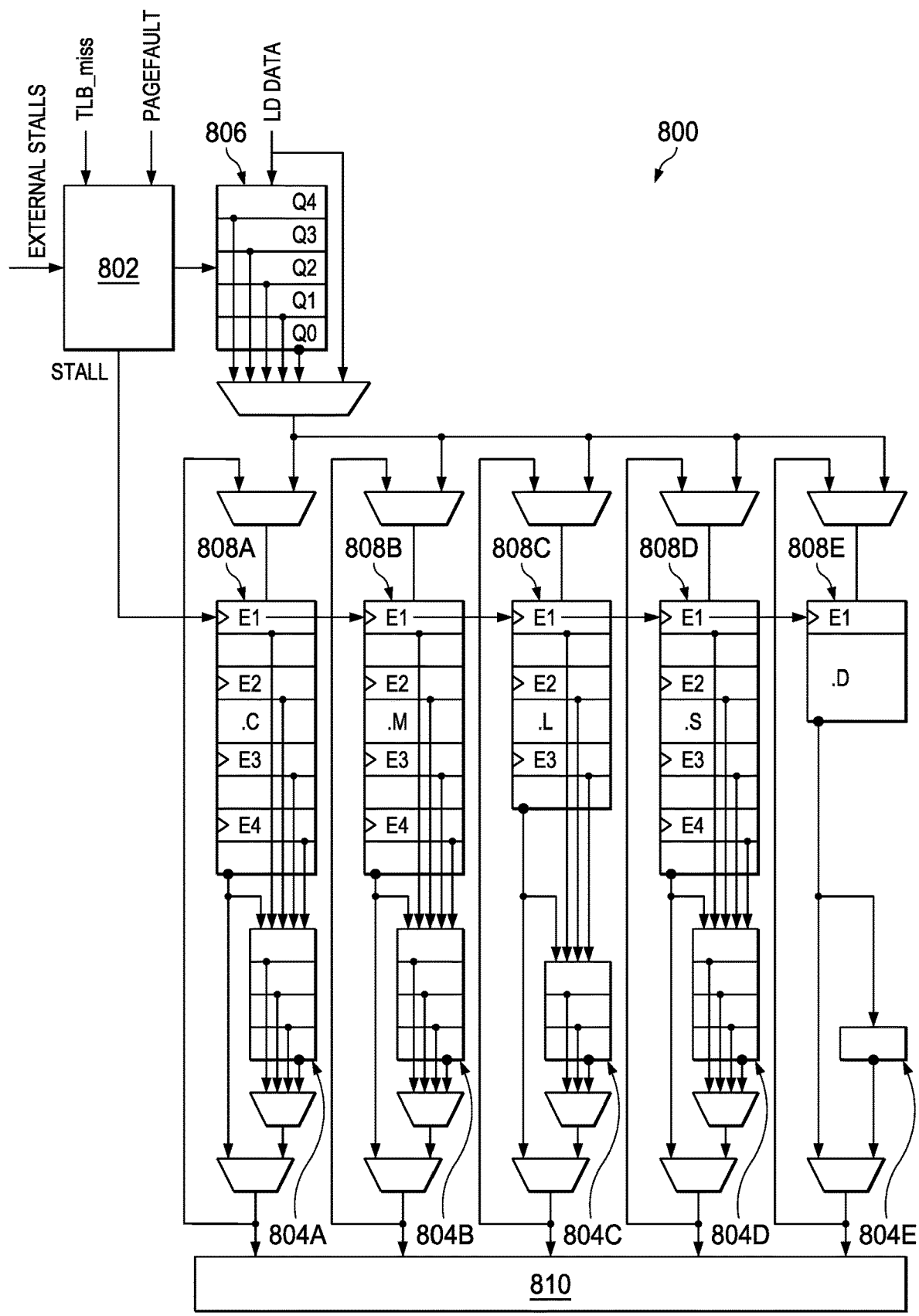
FIG. 8 is a circuit diagram illustrating example functional units and capture queues within the data path, in accordance with aspects of the current disclosure.

FIG. 8 is a circuit diagram 800 illustrating example functional units and capture queues within the data path, in accordance with aspects of the current disclosure. While shown in the context of a scalar data path, in certain cases, capture queues may be utilized with both scalar and vector data paths. According to certain aspects, capture queues may include a scoreboard 802 including hazard detection logic, local unit capture queues 804A-804E (collectively 804), and a central capture queue 806. The scoreboard 802 includes a writeback queue comprising a set of registers and the scoreboard 802 is coupled to an associated set of functional units 808A-808E (collectively 808) and the central capture queue 806. The functional units 808 may be each associated with a respective local unit capture queue 804.

In accordance with certain aspects, capture queues help enable recoverable interrupts in a pipelined processor. As discussed above, a processor pipeline may include multiple stages, each stage performing a discrete step to process the instruction. Multiple instructions may be executing at different stages of the pipeline. Stalling and clearing the entire pipeline, for example, to handle an interrupt, is relatively inefficient. Moreover, interrupt handler instructions are executed via the processor pipeline stages and clearing the entire pipeline would not change the number of cycles needed for the interrupt handler instructions to clear the processor pipeline. Rather than discarding partially executed instructions, execution of these instructions may continue to completion and the results stored to the capture queue structure. For example, a four cycle MPY32 instruction may be received, followed by a multi-cycle load (LDD) instruction in the next processor cycle. When the LDD instruction is received, the MPY32 instruction is in the E2 cycle. During processing in E1, the LDD instruction incurs a cache miss resulting in an exception. The LDD instruction is then discarded and the exception handler is loaded. However, the MPY32 instruction can continue to execute to completion in the E2-E4 stages and the result of the MPY32 instruction stored in the capture queue. In certain cases, the result of the MPY32 instruction may be stored in the central capture queue 806 as the local capture queue 804 may be needed by instructions of the exception handler. As the MPY32 instruction continues, instructions of the exception handler may also be executed in the pipeline. Once the exception handler finishes, the LDD instruction may be reissued to E1 for execution and the results of the MPY32 instruction restored to the local capture queue 804 for output to the output register 810.

Progress of instructions that take more than one execution cycle may be tracked to help make sure information is written to the correct location and at the correct time, in accordance with aspects of the present disclosure. For example, the scoreboard 802 may include a writeback queue. In certain cases, the writeback queue may be a set of registers that may be used to store information associated with an entry to a local capture queue 804. The information in the writeback queue may include a lifetime tracking value and an indication of which local capture queue a corresponding instruction should be written back to.

In unprotected mode and as the instruction enters the E1 stage, the value of the lifetime tracking value corresponds to the expected number of cycles needed for the functional unit 808 to process the instruction. These lifetime tracking values may be adjusted, such as by decrementing the value, for each clock cycle where the processor is not stalled. The lifetime tracking value may be stalled anytime the pipeline is stalled. This scoreboarding helps enable interrupt/event recovery by tracking where values from the local unit capture queues 804 should be restored to. When the lifetime tracking value equals 0, the results of the instruction are ready to be written back to the output register.

If an instruction is interrupted before the lifetime tracking value has become zero, the instruction result and its corresponding lifetime tracking value may be saved to maintain correct execution upon returning from the interrupt. For example, upon receiving the interrupt, the scoreboard 802 may stall the pipeline and any portion of the MPY32 instruction that had already been performed and the state of the pipeline stages may be saved to the local unit capture queue 804 and then to the central capture queue 806. The corresponding lifetime tracking value may also be saved, for example, in the writeback queue. The interrupt may then be processed and after the interrupt is handled, any results and state related to the MPY32 instruction saved in the local unit capture queue 804, or the central capture queue 806, may be restored. Processing of the MPY32 may then resume based on the restored lifetime tracking value.

In certain cases, an instruction in the first stage of execution, for example the E1 stage, will not be restored in the first stage. Rather, the instruction can be reloaded into the first stage and run when processing resumes. For example, in certain cases, a pipeline can receive two instructions at once as a double. In such cases, the results of these two instructions may output in the same cycle. As a more specific example, SUB and LDD commands may be issued together as a double instruction. The two commands both enter the E1 stage and are processed. The LDD command, while attempting to access a memory address to output the contents of the memory address, may experience a page fault and throw a page fault exception. As the SUB command is a single cycle command, a result of the SUB command is ready for output at the end of the E1 stage. This output may be saved to the central capture queue 806 as the E1 stage, in certain cases, may not have an associated local capture queue. Execution then proceeds to the exception handler. After the exception handler finishes, execution returns to the main process. As the first execution of the LDD command resulted in an exception, the LDD command needs to be re-executed to obtain the desired results. The results of the SUB command stored in the central capture queue 806 may then be discarded as the SUB and LDD double instruction is reloaded into E1 and re-executed. In certain cases, a two-cycle command may be issued as a part of a double instruction, for example with the LDD command. The multi-cycle command may then proceed to E2 prior to the exception handler execution and would be allocated a writeback queue entry. Generally, a writeback queue entry is made whenever there is an item stored in the local capture queue. The multi-cycle command may also be rolled back into E1 and re-executed with the LDD instruction. However, rolling back the execution state may require tracking more instruction results than the number of pipeline stages. In certain cases, the number of registers in the writeback queue may exceed the number of pipeline stages to handle boundary cases around tracking instructions that are exiting the E1 stage to the E2 stage and generating an output, but are going to be rolled back to the E1 stage.

In certain cases, if execution of the MPY32 instruction has already begun when the interrupt is received, for example, the MPY32 instruction is in the E2-E4 stages, then the MPY32 instruction may be executed to completion and the results stored in the central capture queue 806 via the local unit capture queue 804. After the interrupt is handled, the stored results from the MPY32 instruction are restored from the central capture queue 806 to the local unit capture queue 804 for output.

In certain cases, the local unit capture queue 804 and central capture queue 806 may be omitted and instead a save memory or register may be used to enable interrupt handling in unprotected mode. In such cases, if an interrupt is received after execution of an instruction has started, for example in the E2-E4 stages, the instruction may be executed to completion and the results stored in the save memory. After the interrupt is handled, then the stored result is written to the output register. If the interrupt is received before execution of the instruction has started, for example in the E1 stage, then the instruction is reloaded after the interrupt is handled. If the instruction passes the E1 stage and moves to E2, a local unit capture queue may be allocated for the instruction.

In accordance with certain aspects, information in the writeback queue may also include a latency value to help track the lifetime of an associated instruction. The latency value may be adjusted, such as by decrementing the value, for each clock cycle, regardless whether the pipeline is stalled. If there are no pipeline stalls, then both the lifetime tracking value and the latency value will expire at the same time and the results of the instruction may be written to the output register file. As discussed above, adjusting the lifetime tracking value associated with the instruction may be stalled if the pipeline is stalled. However, if the instruction is past the E1 stage, execution of the instruction continues until the instruction is completed. In such cases, the latency counter will reach its expiration value (e.g., zero) before the lifetime tracking value reaches its expiration value (e.g., zero) and the results of the instruction may be captured in the local unit capture queue. Where an output has been captured by the local unit capture queue, the writeback queue entry may continue to track the output until the lifetime reaches its expiration value. When the lifetime value reaches its expiration value and the pipeline is not stalled, the output may be transferred from the local unit capture queue into the output register file specified by the instruction.

In accordance with certain aspects, the scoreboard 802 may also track memory load operations which have not completed, such as those due to unexpected events in the memory system (for example, a cache miss). In certain cases, the scoreboard 802 may track up to a fixed number of (for example, up to eight) outstanding loads which have not completed before stalling a pipeline due to L1D read data not being returned. There are at least three general conditions that may result in a pipeline stall due to memory load conditions. First, in protected mode, if a destination of a load instruction is read as an operand to a subsequent instruction before the L1D data cache can return data, then the pipeline is stalled until the L1D data cache returns data. Second, in either protected mode or unprotected mode, if the destination of a load instruction is read as an operand to an instruction, and the L1D data cache indicates that it will not have the data by the 4 cycle L1D cache latency, then the pipeline will stall. Third, if the processor has sent eight load instructions and data has not been returned for any of them, then the pipelines will stall when it encounters the next load instruction, provided it has not stalled already due to any of the above reasons.

Using the scoreboard 802 to track memory load behavior helps allow the processor to accept data returns from the memory system in any order. In certain cases, the processor can be configured to send a transaction identifier (ID) with each load instruction, and the L1D can return the corresponding transaction ID with the load data. The scoreboard 802 may also allow the compiler to hoist load instructions further up in the schedule and to hide L1D cache miss penalties when the compiler knows it has enough other work for the processor. In addition, the scoreboard 802 allows the L1D data cache to support hit-under-miss behavior, leading to possible performance improvements in code which has a mixture of loads which are likely to miss (such as large database item lookups), and loads that are likely to hit (such as stack accesses).

In accordance with certain aspects, the central capture queue 806 may be holding contents of the local unit capture queues 804, for example, when an interrupt or exception event occurs. The central capture queue 806 may include one or more holding registers Q0-Q4 to delay updates to the processor register in case a problem is detected with one or more instruction writebacks which should occur at the same time as an instruction leaves the E1 execution phase. For example, during execution of a load or store instruction, a page fault as a part of branching to the page fault handling service may be detected by the micro translation lookaside buffer (µTLB). Generally, the µTLB translates load/store instruction addresses to physical mappings. In the event that the virtual to physical address mapping cannot be found for a particular memory access instruction, the µTLB triggers the page fault in the E1 execution phase. The load/save instruction is then placed into the central capture queue 806. In protected mode, all instructions ahead of the load/save instruction which caused the page fault to complete normally. In unprotected mode, if an instruction ahead of the load/save instruction which caused the page fault has not reached its normal writeback cycle prior to the detection of the page fault by the µTLB, the results of such an instruction will be saved in the central capture queue 806 or local unit capture queue 804 to be output to the register file after the page fault is resolved. After the page fault is resolved, such as after the correct page translation entry is located, the load/save instruction is restored and execution with the correct page translation entry resumed. In certain cases, a correctable problem with the execution of the instruction may be detected when the instruction is in the E2 stage of execution. If the processor determines that an instruction has a correctable problem in the E2 stage, the register file updates that were delayed in the central capture queue 806 will be returned to the local unit capture queues 804, so they can be saved when the processor transfers execution to the exception handler.

According to certain aspects, in protected mode, when an interrupt is received, execution of the instructions already in the pipeline before the interrupt are executed normally, followed by the interrupt, and then the remaining instructions are executed. As the program expects the processor to insert delays as needed, interrupt handing is straightforward. In unprotected mode, as instruction scheduling is handled by the application program or compiler itself, attempting to execute an interrupt in the middle of executing application code would likely throw off the instruction scheduling. The local unit capture queues can be used to help address such a potential scheduling issue. When operating in unprotected mode, when an interrupt is received, the contents of a pipeline of the functional unit handling the interrupt may be written to the local unit capture queues. The interrupt is then processed and the pipeline restored after the interrupt is handled. However, the capture queues may be used for data hazard and load/store out of order completion, as well as handling interrupts. In some cases, the pipeline may be operating in unprotected mode prior to receiving the interrupt, but is switched, such as by the interrupt handler, to protected mode after the interrupt is received but before returning control to the application code. As the local unit capture queues may be used when operating in protected mode, the pipeline data in the local unit capture queues may be offloaded, for example, to a memory. This memory space may be space within a cache memory, such as in the L1, L2, or L3 cache, or another memory that may be on-die static random-access memory (SRAM).

When it is known that the local unit capture queues need to be unloaded, such as when an interrupt is received while operating in unprotected mode, the processor can help pre-write allocate a block of memory in the memory space for the contents of the local unit capture queues. Each executing task in the processor is associated with an event context save pointer (ECSP) pointing to the memory space. When the original task is interrupted by the interrupt, or another higher priority task, the state of the pipeline registers for the functional unit are saved to the local unit capture queues and then copied to the block of memory based on a ECSP-A pointing to the block of memory. The functional unit then begins to execute the interrupt task and rewrites the ECSP to ECSP-B associated with the interrupt task. During execution of the interrupt task, the local unit capture queues are used to complete the interrupt task. When the interrupt task completes, the original task is reloaded and the ECSP is rewritten based on ECSP-A. Based on ECSP-A, the state of the pipeline registers is copied to the local unit capture queues and then the pipeline registers. Execution of the original task resumes where the previous execution was left off.

Figure 9:
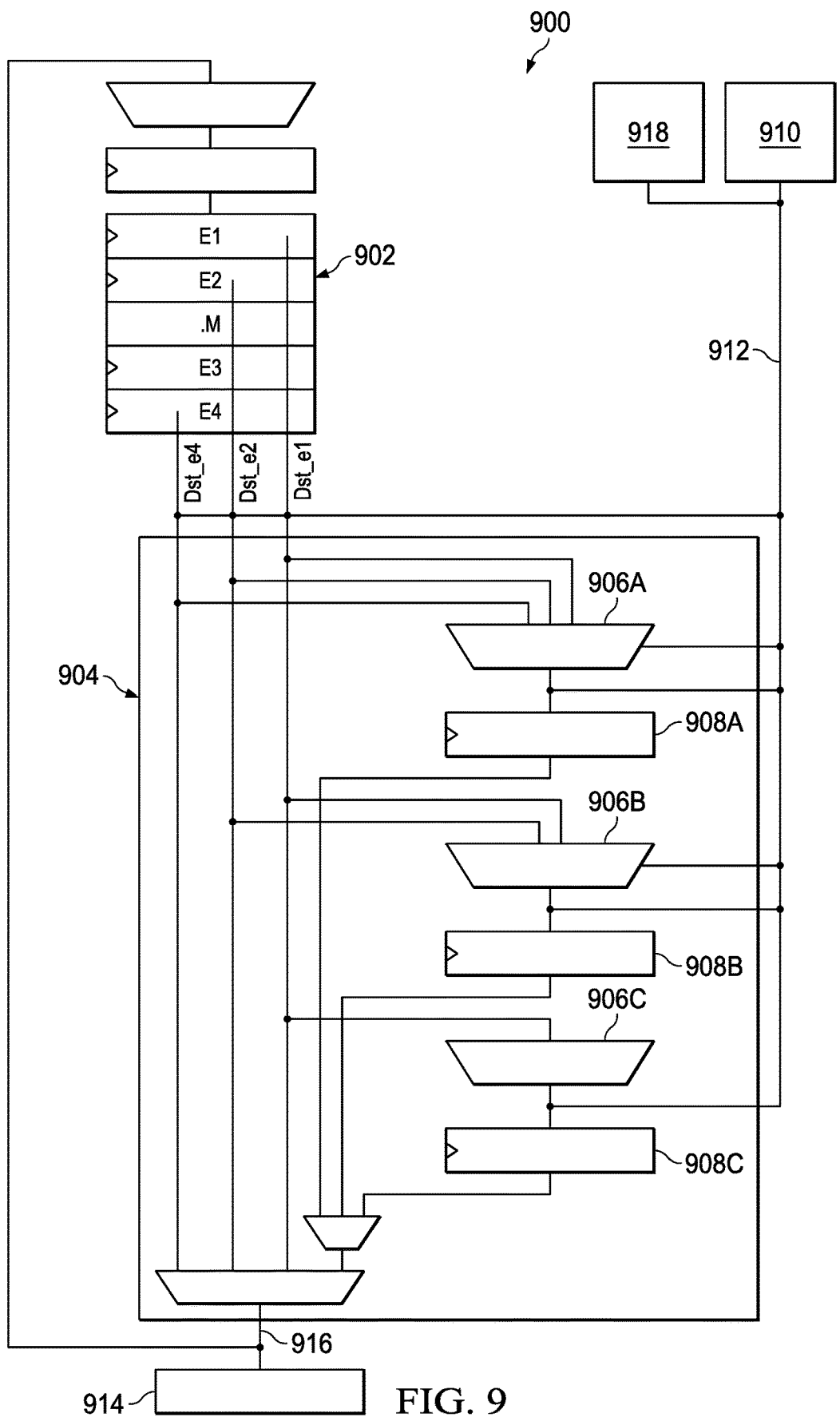
FIG. 9 illustrates an example functional unit, capture queue, and scoreboard complex, in accordance with aspects of the current disclosure.

FIG. 9 illustrates an example functional unit, capture queue and scoreboard complex 900, in accordance with aspects of the current disclosure. A functional unit 902 of the complex 900, as shown, corresponds to the .M functional unit 808B from FIG. 8. The functional unit 902 includes four pipe stages and other functional units may include more or fewer pipe stages. Each pipe stage of functional unit 902 takes one clock cycle to complete. Each instruction can take a different number of cycles to process. For example, a first instruction may take two cycles to complete and the output thus comes from the E2 pipe stage. Each functional unit can produce a single write to the output register file 914 per clock cycle via a results bus 916. A local unit capture queue 904 helps to keep track of the pipeline register contents in a corresponding functional unit. Generally, there may be one local unit capture queue 904 per functional unit. Each pipe stage that can produce a result (here E1, E2, and E4) may be coupled to one or more MUX 906A-906C and capture queue registers 908A-908C of the local unit capture queue 904. Connecting pipe stages to multiple capture queue registers helps processing long series of instructions. For example, it is possible to have a series of instructions in a pipeline which would all attempt to write to the output register in the same clock cycle, such as a four cycle instruction, followed by a three cycle, then two cycle, and one cycle instructions. In such a case, the four cycle instruction would be written to the output register and the three cycle, two cycle, and one cycle instructions stored in capture queue registers 908A-908C.

The local unit capture queue 904 may operate in conjunction with the scoreboard 910. The scoreboard 910 is coupled, along with the central capture queue 918, to MUX 906A-906C and clock gate enables of the capture queue registers 908A-908C via bus 912. Scoreboard 910 maintains a set of registers which may help track whether a functional unit is working on producing a result. A bit corresponding to a register is high if the corresponding register of the functional unit is working on producing the result as the writeback value of the corresponding register. All the functional unit scoreboard tracking register writeback results then get OR'ed together at the top level to consolidate all registers usage per cycle. The scoreboard 908 then may make a set of comparisons. In certain cases, the scoreboard 908 may compare each read operand of each functional unit to detect potential read-after-write hazards in protected mode. For example, if .N scr1 operand is register A1, and A1 will be written back by .M unit in two cycles, .N will detect if another instruction operand is attempting to read A1 and stall the instruction operand which reads A1 at E1 stage until the corresponding bit is set low. The corresponding bit may also be compared against a write address of every unit to detect Write-After-Write hazarding in protected mode. For example, if another functional unit, such as .L, is writing to A1, and A1 will be written back by .M functional unit in three cycles which is two cycles after the .L functional unit has finished working to produce the A1 writeback value, then the hazarding logic is used to load the .L functional unit's local capture queue until .M is done writing A1 and the corresponding bit is set low. Then, the .L functional unit's local capture queue will unload the A1 value from its storage and put it on .L's output.

Figure 10:
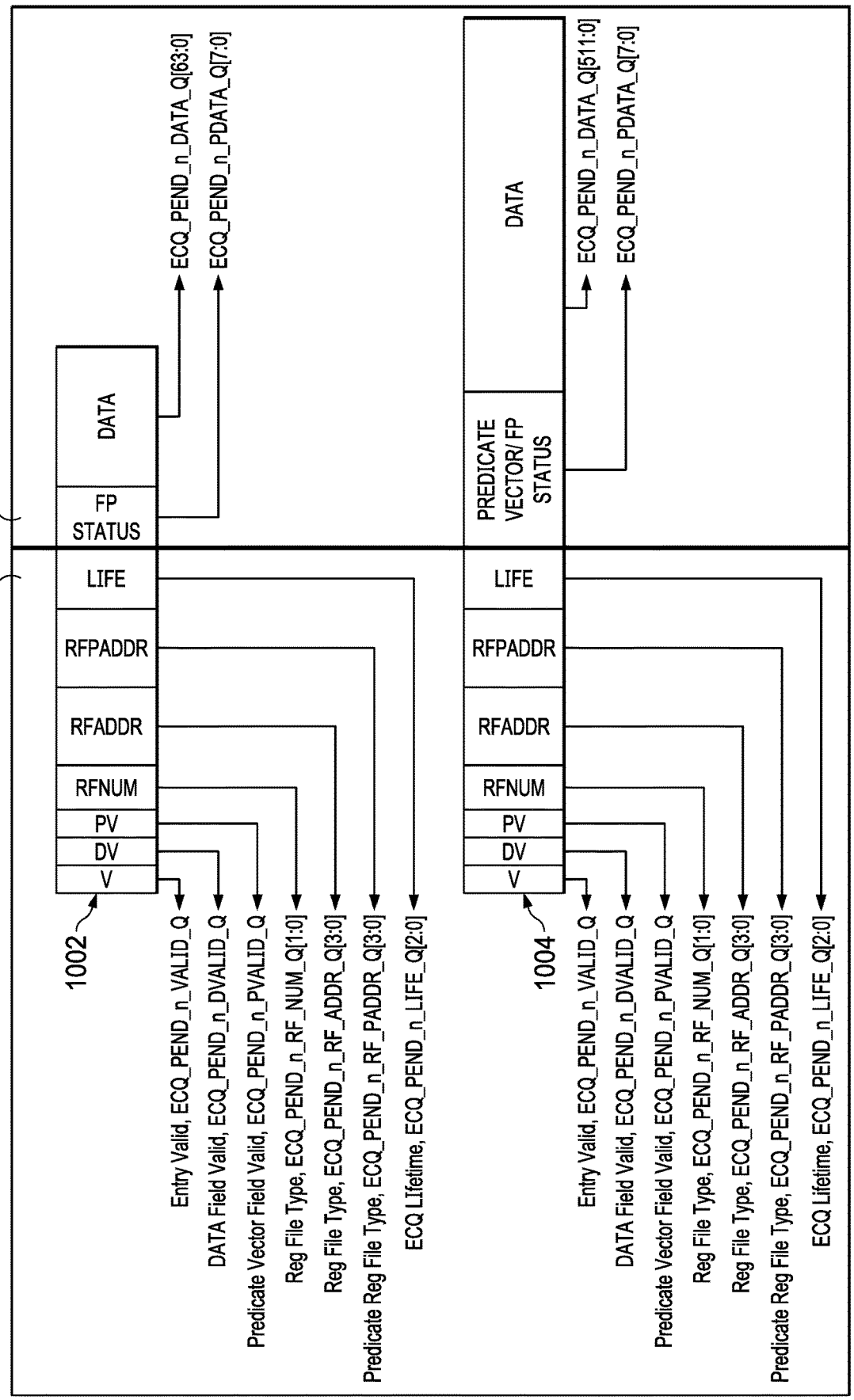
FIG. 10 illustrates example capture queue register bit fields, in accordance with aspects of the present disclosure.

FIG. 10 illustrates example capture queue register bit fields 1000, in accordance with aspects of the present disclosure. It can be understood that the fields shown, their order, and field sizes may vary and that the fields, as illustrated in FIG. 10 illustrate one example of capture queue register bit fields. Bit fields 1002 and 1004 illustrate two example data formats for capture queues and writeback queues. According to certain aspects, information from block 1006 is stored in the writeback queue and information from block 1008 is stored in the capture queues. In this example for the writeback queue, V represents whether a bit is valid, DV indicates whether a write is updating a main register file, PV indicates whether this write is updating the predicate register file, RFNUM encodes which register file is being written, RFADDR encodes a register file address, RFPADDR encodes a predicate register file address, and LIFE encodes the lifetime tracking value. For the capture queues, FP Status represents the predicate file status and DATA represents the stored data.

Figure 11:
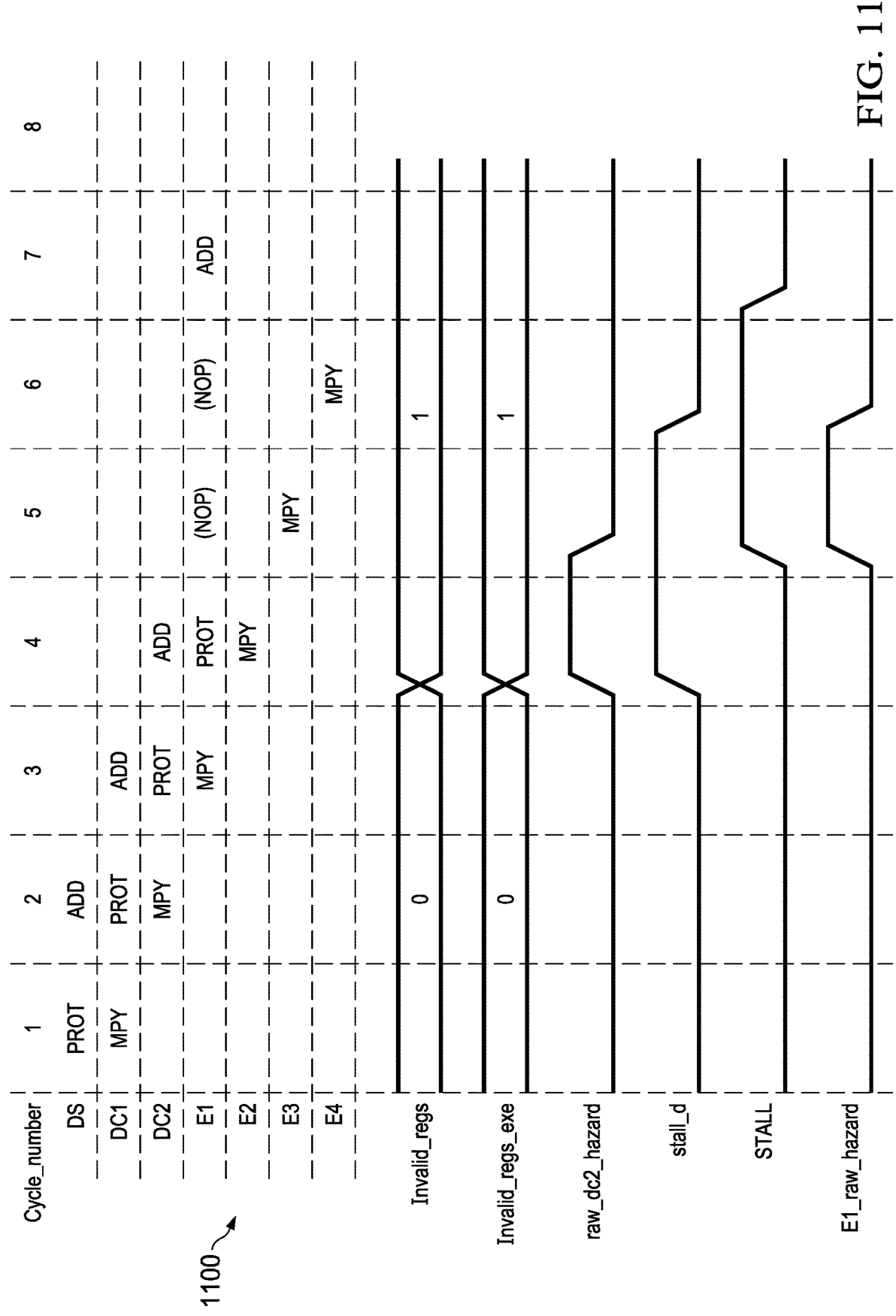
FIG. 11 is a timing diagram of an example fast mode switching, in accordance with aspects of the present disclosure.

FIG. 11 is a timing diagram 1100 of an example fast mode switching, in accordance with aspects of the present disclosure. As illustrated in FIG. 11, the capture queue structure also helps enable fast mode switching as between protected mode and unprotected mode, and vice versa. Previously certain processors could switch, for example between unprotected and protected modes, but generally, would stall the instructions after the switch command until all active instructions were finished. The capture queue helps allow switching from unprotected mode to protected mode, and vice versa, without clearing the pipeline or even stalling in certain cases. For example, while switching from unprotected mode to protected mode, the lifetime of any instructions already in the pipeline may be set to less than 0, such as −1, meaning that that the corresponding instruction should have already been committed to the register file. Hazarding logic, as described above, associated with protected mode then becomes active. In cycle 1 of FIG. 11, the processor pipeline executing the instructions illustrated is executing in unprotected mode. At cycle 4, the PROT command is executed in E1 and the pipeline is switched to protected mode. The lifetime tracking value of MPY is then set to −1. The lifetime tracking value for the ADD command is then set to the value normally associated with the ADD command as execution of the command has not yet begun. Execution of the ADD command then proceeds as normal as discussed above if the ADD command utilizes the A0 register that the MPY32 command is outputting to. In the case that the ADD command does not utilize the same registers as the MPY32 command, then the ADD command can be executed immediately after the PROT command without stalling the pipeline.

Figure 12:
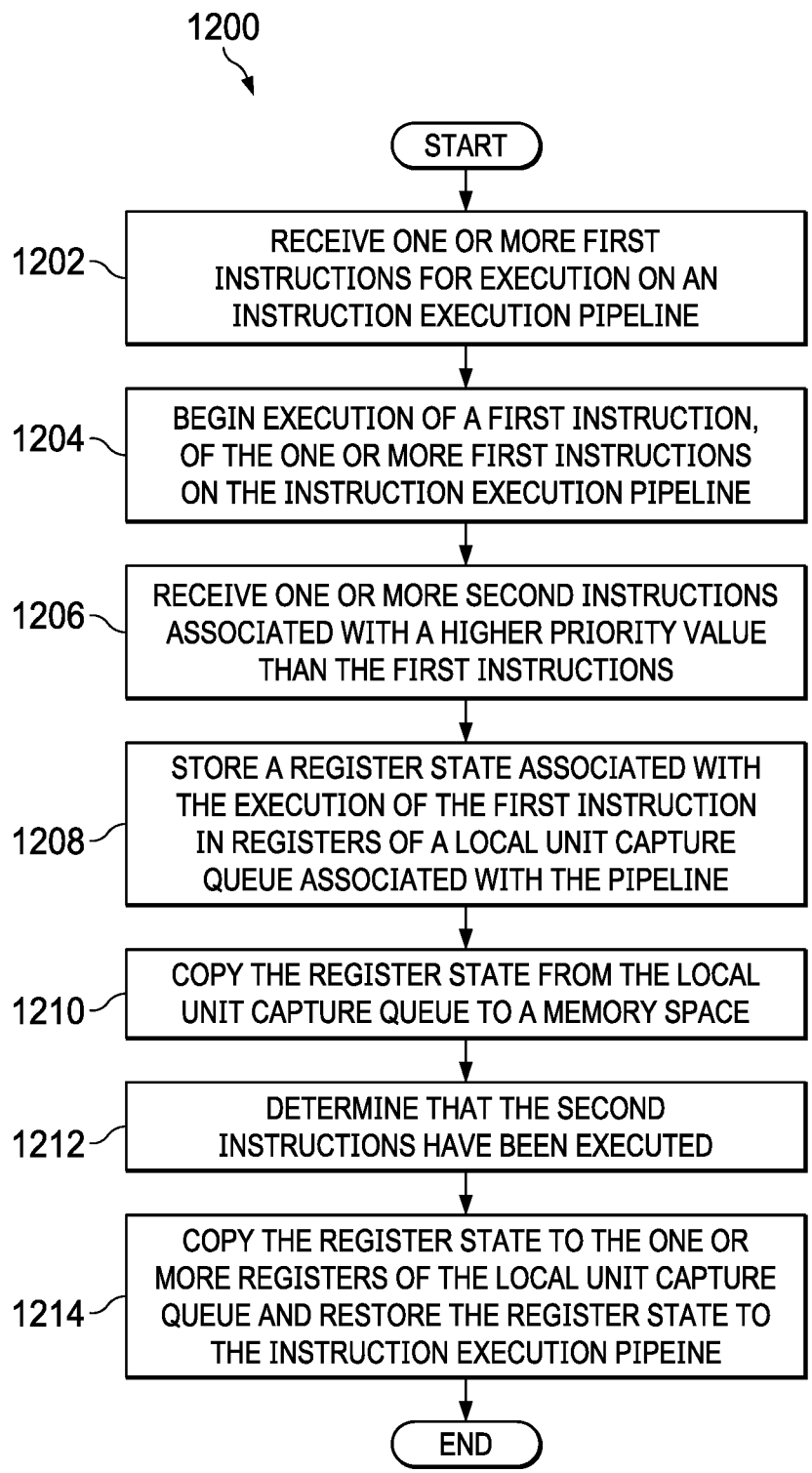
FIG. 12 is a flow diagram illustrating a technique for automatically loading and unloading capture queue contents by a processor, in accordance with aspects of the present disclosure.

FIG. 12 is a flow diagram 1200 illustrating a technique for automatically loading and unloading capture queue contents by a processor, in accordance with aspects of the present disclosure. At block 1202, one or more first instructions for execution on an instruction execution pipeline are received. At block 1204, the execution pipeline of a functional unit may begin execution of a first instruction, of the one or more first instructions on the instruction execution pipeline. For example, the execution pipeline may begin executing a set of instructions at a first priority level. This execution may proceed in an unprotected mode. The set of instructions may be associated with a pointer to a memory space. At block 1206, one or more second instructions for execution on the instruction execution pipeline may be received. The one or more second instructions may be associated with a higher priority level than the first one or more instructions. For example, the processor may receive an interrupt or exception process with a higher priority level than the earlier executing instructions (e.g., from block 1204). At block 1208, the processor stores a register state associated with the execution of the first instruction in one or more registers of a local unit capture queue associated with the instruction execution pipeline. For example, the state of the execution pipeline for the first set of instructions may be saved into the local unit capture queue. At block 1210, the processor copies the register state from the local unit capture queue to a memory space. For example, the information from the local unit capture queue may be copied to an allocated memory space. This memory space may be one or more of a L1, L2, L3 cache or other SRAM memory space. At block 1212, the processor determines that the one or more second instructions have been executed. For example, the processor may determine that the execution of the interrupt or exception handler has finished. At block 1214, the processor copies the register state from the cache memory to the one or more registers of the local unit capture queue and restores the register state to the instruction execution pipeline from the local unit capture queue. For example, after detecting that the higher priority instructions have completed, the processor reloads the saved state information from the memory space to the local unit capture queues and restores the execution pipeline.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

In the drawings, like elements are denoted by like reference numerals for consistency.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A circuit device comprising:
   a functional unit that includes a set of pipeline stages configured to collectively execute a first instruction;
   a local capture queue coupled to the functional unit that includes a set of registers, wherein each register of the set of registers is coupled to a respective stage of the set of pipeline stages to store a respective intermediate result of the first instruction; and
   a scoreboard coupled to the functional unit and the local capture queue and configured to:
      based on receiving the first instruction, set a lifetime tracking value based on an expected duration of execution of the first instruction;
      adjust the lifetime tracking value during the execution of the first instruction by the set of pipeline stages; and
      in response to a second instruction, preempt the first instruction by:
         causing a first register of the local capture queue to store a first intermediate result of the first instruction from a first stage of the set of pipeline stages; and
         based on the second instruction having completed, using the lifetime tracking value to restore the first intermediate result to the set of pipeline stages.

2. The circuit device of claim 1 further comprising:
   a second capture queue coupled to the scoreboard, wherein the scoreboard is further configured to, in response to the second instruction, cause the second capture queue to store contents of the local capture queue including the first intermediate result such that, during execution of the second instruction, each register of the set of registers of the local capture queue is configured to store a respective intermediate result of the second instruction.

3. The circuit device of claim 2, wherein the scoreboard is further configured to, based on the second instruction having completed, transfer the contents including the first intermediate result from the second capture queue to the local capture queue.

4. The circuit device of claim 2 further comprising a cache memory that includes the second capture queue.

5. The circuit device of claim 1, wherein the scoreboard is configured to preempt the first instruction based on the second instruction being associated with an interrupt.

6. The circuit device of claim 1, wherein the scoreboard is configured to preempt the first instruction based on the second instruction being associated with an exception event.

7. The circuit device of claim 1, wherein the scoreboard is configured to preempt the first instruction based on the second instruction having a higher priority than the first instruction.

8. The circuit device of claim 1, wherein the scoreboard is configured to preempt the first instruction based on the execution of the first instruction being in an unprotected pipeline mode.

9. The circuit device of claim 8, wherein the scoreboard is configured to allow a third instruction to execute without preemption based on execution of the third instruction being in a protected pipeline mode.

10. The circuit device of claim 1, wherein the scoreboard is configured to:
    set the lifetime tracking value to be an expected number of cycles for the execution of the first instruction; and
    adjust the lifetime tracking value by decrementing the lifetime tracking value during each clock cycle that the execution of the first instruction by the set of pipeline stages proceeds without a stall.

11. A method comprising:
    receiving a first instruction for execution using a set of pipeline stages;
    based on the receiving of the first instruction, setting a lifetime tracking value based on an expected duration of execution of the first instruction;
    executing the first instruction using the set of pipeline stages;
    during the executing of the first instruction, storing a set of intermediate results of the first instruction in a local capture queue;
    during the executing of the first instruction, adjusting the lifetime tracking value; and
    receiving a second instruction; and
    based on the receiving of the second instruction, preempting the first instruction, wherein the preempting includes:
        storing a first intermediate result of the first instruction provided by a first stage of the set of pipeline stages in the local capture queue; and based on the second instruction having completed, restoring the first intermediate result to the set of pipeline stages using the lifetime tracking value.

12. The method of claim 11, wherein the preempting includes transferring contents of the local capture queue including the first intermediate result to a second capture queue.

13. The method of claim 12, wherein the preempting includes, based on the second instruction having completed, transferring the contents from the second capture queue to the local capture queue.

14. The method of claim 11, wherein the preempting of the first instruction is based on the second instruction being associated with an interrupt.

15. The method of claim 11, wherein the preempting of the first instruction is based on the second instruction being associated with an exception event.

16. The method of claim 11, wherein the preempting of the first instruction is based on the second instruction having a higher priority than the first instruction.

17. The method of claim 11, wherein the preempting of the first instruction is based on the execution of the first instruction being in an unprotected pipeline mode.

18. The method of claim 17 further comprising allowing a third instruction to execute without preemption based on execution of the third instruction being in a protected pipeline mode.

* * * * *